United States Patent [19]

Ueberegger

[11] Patent Number: 4,623,117
[45] Date of Patent: Nov. 18, 1986

[54] TOOL FOR MOULDING THE TOP PART OF A PLASTICS CONTAINER

[75] Inventor: Heinrich Ueberegger, Uster, Switzerland

[73] Assignee: KMK Karl Mägerle Lizenz AG, Zug, Switzerland

[21] Appl. No.: 556,781

[22] Filed: Dec. 1, 1983

[30] Foreign Application Priority Data

Dec. 2, 1982 [CH] Switzerland ............... 7003/82

[51] Int. Cl.⁴ .............. B29C 33/00; B29C 45/26
[52] U.S. Cl. ................... 249/122; 249/175; 249/186; 425/542; 425/577; 425/412
[58] Field of Search ............ 264/DIG. 41; 425/110, 425/127, 129 R, 457, 468, 577, 542, 412; 29/525; 249/122, 175, 176, 184, 186

[56] References Cited

U.S. PATENT DOCUMENTS

| | | | |
|---|---|---|---|
| 1,751,624 | 3/1930 | DuBrul | 264/504 |
| 2,343,143 | 2/1944 | Gill | 29/525 |
| 2,812,548 | 11/1957 | Quinche et al. | 425/129 R |
| 3,074,292 | 1/1963 | Polmon | 29/525 |
| 3,172,933 | 3/1965 | Flax | 264/248 |
| 3,280,423 | 10/1966 | Voumard | 425/86 |
| 3,330,006 | 7/1967 | Jenkins | 425/125 |
| 3,375,553 | 4/1968 | Criss | 425/587 |
| 3,418,012 | 12/1968 | La Torre | 29/525 |
| 3,511,845 | 5/1970 | Scalora | 264/294 |
| 3,555,606 | 1/1971 | Hedgewick | 425/577 |
| 3,670,066 | 6/1972 | Valyi | 264/148 |
| 4,352,775 | 10/1982 | Mägerle | 264/500 |

FOREIGN PATENT DOCUMENTS

| | | | |
|---|---|---|---|
| 691156 | 7/1964 | Canada | 264/DIG. 41 |
| 441717 | 1/1968 | Switzerland | 264/DIG. 41 |

Primary Examiner—Willard E. Hoag
Attorney, Agent, or Firm—Cushman, Darby & Cushman

[57] ABSTRACT

A moulding tool for producing tube ends and simultaneously connecting them to a tube body, the tool comprising a female mould (1) and a male mould (19) and having a pin movably disposed in the female mould and a bore (22) in the male mould. The pin has a conical portion (25) extending into a conical part (23) of the bore and, when the mould is closed, co-operates with the bore to form a cavity (30) connected to a mould cavity between the male mould (19) and the female mould (1).

16 Claims, 2 Drawing Figures

TOOL FOR MOULDING THE TOP PART OF A PLASTICS CONTAINER

FIELD OF THE INVENTION

The invention relates to a tool for moulding plastic containers.

BACKGROUND OF THE INVENTION

Packing tubes having a top part including a continous axial neck channel and lateral access passages opening into it are known. The tube neck is prefabricated and inserted into the top of the tube so that it projects into the body thereof. The access passages and the neck channel communicate with the tube interior and serve to form a strand having parallel strips at its surface. If the material near the access passages has a different colour from the rest of the material, the strips can be coloured.

Since the access passages in the neck form external undercut portions, the known moulding tools have an inner part forming the neck channel and also have a multiple outer part, e.g. with radially movable jaws, so as to release the undercut portions when the tube neck is released from the injection mould.

In addition to the cost of manufacturing these tools, the cost of operating them is considerable. They also have a short working life, owing to the relatively rapid wear on the jaw parts. The necks are therefore expensive to produce.

SUMMARY OF THE INVENTION

An object of the invention, therefore, is to provide a moulding tool for manufacturing top parts, the tool being free from radially moving parts.

The object of the invention is obtained by providing a tool having an outer part into which an axially movable inner part extends. The outer part has a peripheral non-divided casing and the one-piece inner part comprises a pin having a first portion which penetrates without clearance into the casing bore. The inner part also has longitudinal grooves and a second portion having a smaller diameter than the first portion and the sleeve bore.

Since the access passages into the neck channel originate where the first portion of the pin co-operates with the casing bore without clearance, i.e. in the peripheral regions of the first portion between the slots, and since these peripheral regions form ribs extending along the entire depth of penetration of the first portion, there is no need for outer or inner undercuts. The tool can thus be opened and closed simply by axial relative motion of the sleeve and pin, the top part also being releasable from the mould in the axial direction.

The tool according to the invention can be used to produce neck parts by injection or compression moulding.

According to a preferred embodiment of the invention, the end of the second portion of the pin rests in a guide formed by the sleeve bore. As a result the ribs formed between the slots in the first portion are relieved of pressure, more particularly when the tool is opened or closed, and are less worn by friction.

According to another advantageous feature, the first portion of the pin is conical and engages in a part of the casing boring having the same conicity. This ensures that the access passages are completely moulded even if the first portion has become worn at the ribs. Depending on the wear, the pin can penetrate more deeply into the casing until the clearance between the first portion and the corresponding part of the casing bore has come to an end. If, according to another preferred feature, the pin bears axially against the end of the second portion in the casing, in order to absorb the tool-closing pressure and prevent the ribs from being pressed flat, the end can be re-machined to ensure deeper penetration.

Advantageously the end of the second pin portion is formed by a cylindrical spigot and the guide is formed by a cylindrical part of the casing bore, the depth of penetration of the spigot into the cylindrical bore part being greater than the depth of penetration of the first portion into the sleeve bore. As a result, when the tool is closed, the spigot supports and centres the pin part relative to the casing bore even before the first portion penetrates thereinto.

A critical advantage of the tool according to the invention is that it is much more economical in manufacturing container ends or containers having a neck than the previously-mentined manner. According to another feature, the container end is made in one piece, i.e. the neck channel is produced in the same moulding operation as the end.

According to the last-mentioned feature, therefore, the casing and the pin can form parts of a moulding tool which, e.g., moulds the entire tube end including the neck part, either as a prefabricated part of the tube or joined to a prefabricated tube body to form a finished packing tube.

The packing tube is suitable for producing a continuous strand of filling material at the tube and at the access passages and differing e.g. in colour and/or in the degree or nature of flavouring, irrespective of whether the differences in flavour are due to manufacturing or storage.

BRIEF DESCRIPTION OF THE DRAWINGS

The tool according to the invention will now be described in detail with reference to an embodiment shown in the accompanying drawings, in which.

DETAILED DESCRIPTION OF THE INVENTION

Figure 1:
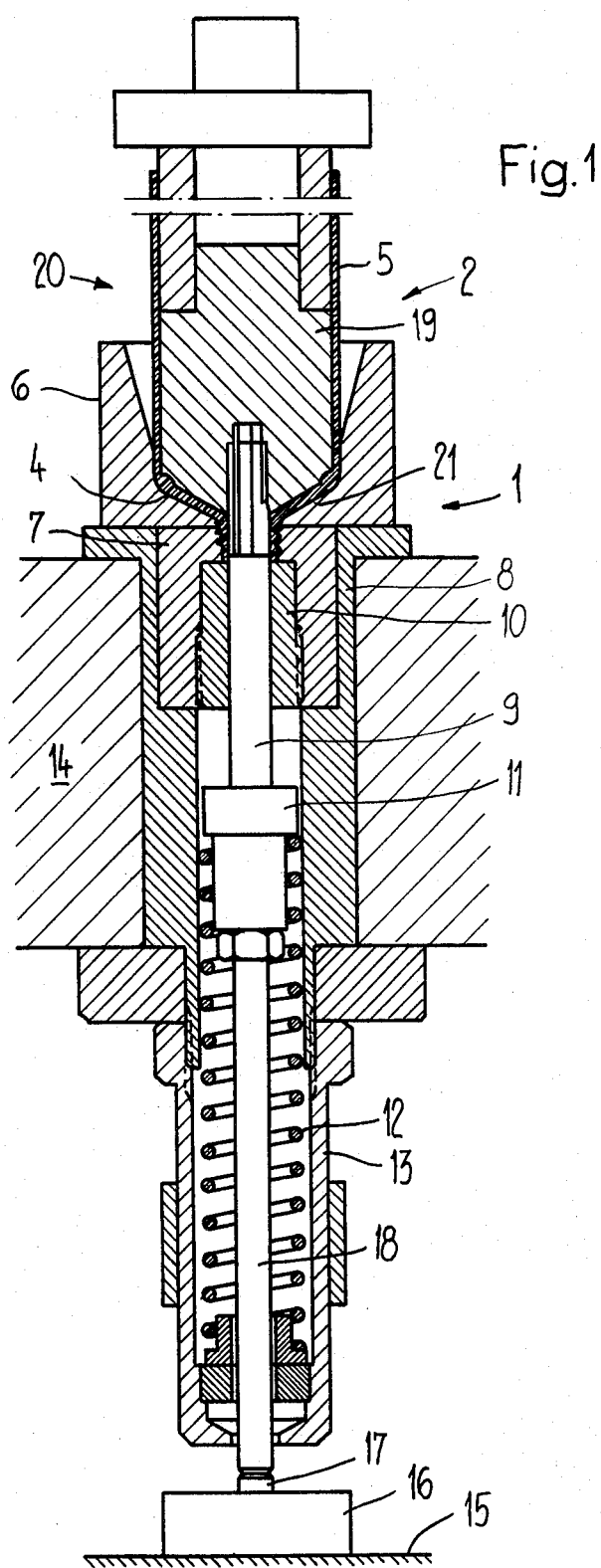
FIG. 1 shows an axial section through the embodiment of the tool.

In FIG. 1, the general reference 1 denotes a female mould and the general reference 2 denotes a moulding-tool punch. The tool is for producing a plastics tube end 4 and simultaneously joining it to a prefabricated tube 5. Tube 5 is made either entirely of plastics or of composite material comprising plastics layers and having an e.g. metal intermediate layer.

Mould 1 comprises a shoulder part 6 and a threaded part 7, the threaded part being rotatably and drivably mounted in a bushing 8 (the drivable means not shown). Part 6 is rigidly secured to the bushing.

A pin 9 which extends coaxially through the threaded part 7 of mould 1 is movably guided in a bearing insert 10 and has an end 11 disposed in bushing 8. A pressure spring 12, which bears against a screw cap 13 on bushing 8, engages end 11 and counteracts any downward displacement of pin 9.

Bushing 8 is inserted on a schematically-indicated turntable 14 drivable stepwise around a vertical shaft (not shown). Turntable 14 is part of a tube-manufacturing machine having a number of stations. A cylinder-piston unit 16 is disposed on the machine frame 15 at each station to which the moulding tool is connected after being filled with plastics to produce the tube end. During operation, a piston rod 17 of unit 16 co-operates with a push-rod 18 rigidly secured to end 11 of pin 9 so as to hold the pin in the illustrated position. FIG. 1 shows the e.g. pneumatic unit or piston rod in the inoperative position, in which the piston rod has released the push-rod 18 secured to end 11 for rotating the turntable 14.

Punch 2, which bears tube 5, comprises a cylindrical mandrel 20 movably secured to turntable 14 in known manner (not shown here) and a male mould 19 secured to the free end of mandrel 20 and co-operating with female mould 1. Mandrel 20 or punch 2 can be disposed e.g. in the manner indicated in German Offenlegungsschrift No. 30 23 415, so that mould 19 remains continuously associated with mould 1 when turntable 14 rotates. Mould 19 together with tube 5 penetrate into shoulder part 6 and co-operate therewith to bound a mould cavity 21 which is filled with thermoplastic material. When cavity 21 is closed by axial motion of punch 2 in the direction of the female mould, the plastics is moulded to form the end part 4 as illustrated and is simultaneously welded to tube 5 by the heat in the plastics. The plastics can be inserted into the cavity when the punch 2 is removed from the immediate neighbourhood of the female mould, i.e. in the previously-mentioned manner disclosed in DE-OS No. 30 26 415.

According to the invention a casing is provided—i.e. mould 19 in the illustrated embodiment. Alternatively, however, the casing can be independent of the male mould if it is not necessary to manufacture the entire tube end. If, however, the tube end is manufactured in one piece, the male mould can comprise two or more parts, in which case the casing will be a radially inner component.

Figure 2:
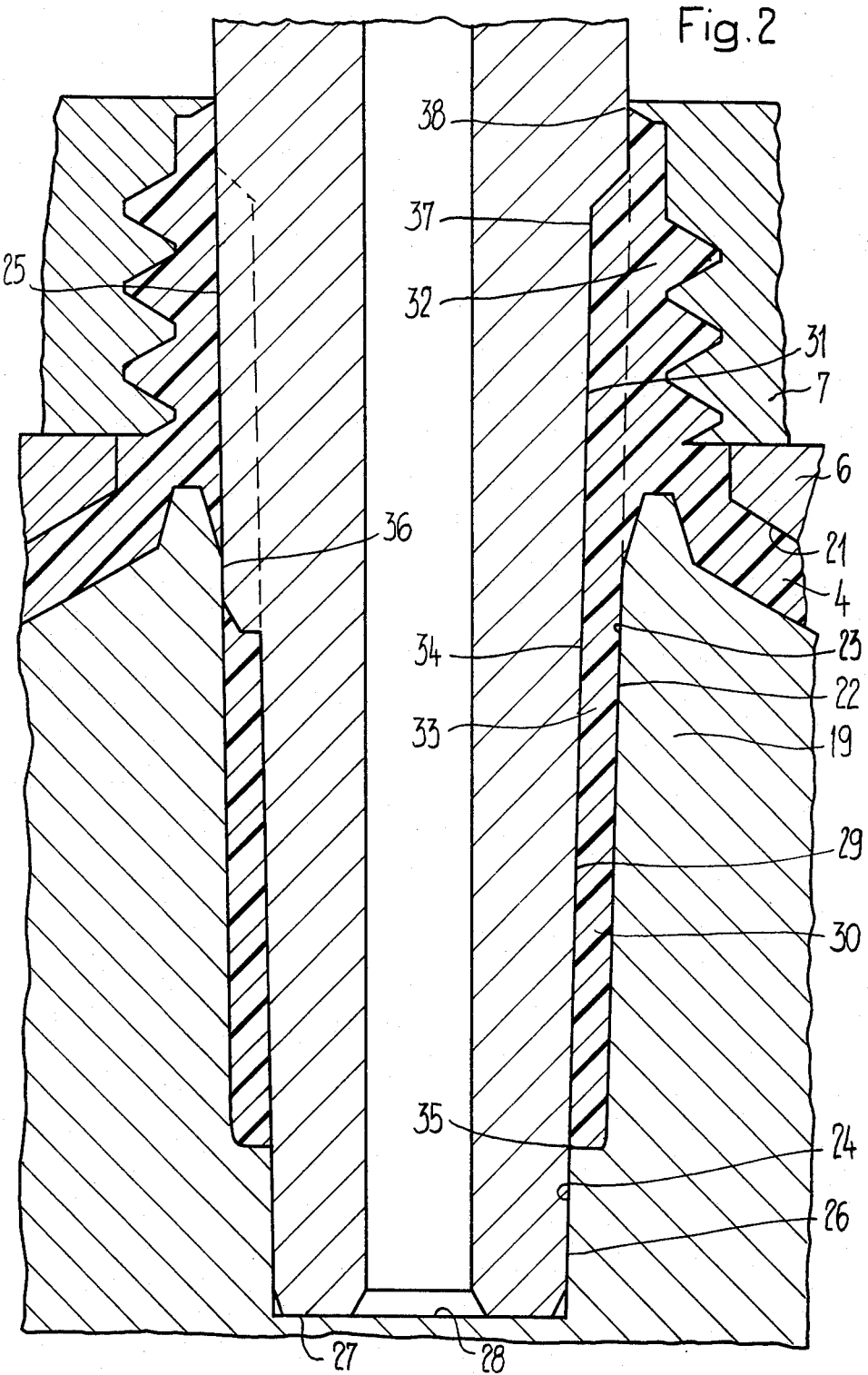
FIG. 2 shown an enlarged portion of FIG. 1.

In the illustrated embodiment, mould 19 has a bore 22. As shown in detail in FIG. 2, the bore has a conical part 23 and a reduced-diameter cylindrical part 24. Pin 9, which extends through mould cavity 21, has a first conical portion 25 extending into part 23 and a cylindrical portion 26 at its free end extending into part 24. End face 27 of pin 9 abuts the bottom 28 of bore 22. Portion 25 has slightly less conicity than part 23 and co-operates therewith without clearance. However, the force exerted axially on pin 9 is absorbed at bottom 28.

Between the first conical portion 25 and the cylindrical portion 26, pin 9 has another conical portion 29 and co-operates with part 23 to form a cavity 30. In portion 25, pin 9 has a number of uniformly-distributed peripheral slots or grooves 31 which extend axially and connect cavity 30 to cavity 21. Accordingly when the mould is completely closed, plastics can flow from the diminishing cavity 21 through slots 31 into cavity 30 and fill it and the slots.

When the mould closes—a process which begins after a proportioned quantity of plastics, e.g. in the form of a ring, has been inserted into mould1—punch 2 moves axially relative to mould 1 so that pin 9 penetrates into bore 22. Cylindrical portion 26 first comes into engagement with cylindrical portion 24, since the depth of penetration of member 26 into member 24 is greater than that of member 25 into member 23. As a result of engagement, pin 9 in centred in bore 22. Finally, when end face 27 abuts bottom 28 and portion 25 simultaneously engages or touches part 23, the areas of portion 25 between slots 31 bear only a small load. Consequently, the engagement between portion 25 and part 23 can be kept free from clearance during a large number of closing operations by the moulding tool.

Since the prestressed pressure spring 12 normally holds pin 9 in a position in which end or top 11 bears against insert 10, the end face 27 of the pin bears against bottom 28 before mould 19 presses into shoulder part 6. If, during the closing operation, punch 2 moves further in the direction of mould 1, pin 9 moves against the action of spring 12. Mould 19, which is penetrating into shoulder part 6, then begins to displace and consequently distribute the plastics therein, partly into the threaded part 7. In addition, the plastics displaced in the shoulder part flows to and combines with the end of tube 5 extending beyond the male mould. Displaced plastics also flows into slots 31 or cavity 30. In order to prevent pin 9 being moved against the action of spring 12 by the pressure which rapidly builds up in the plastics when the volume of the moulding cavity is reduced, the spring is prevented by push-rod 18 and piston rod 17 from moving during the last part of the closing travel of punch 2. To this end, after the illustrated moulding tool arrives at the corresponding station, cylinder and piston unit 16 is actuated so as to move piston rod 17 under pressure into a top end position. The blocking force acting on piston rod 17 is less than the closing force of punch 2, and therefore punch 2 can reach the illustrated closing position when pin 9 via push rod 18 pushes the piston rod 17 slightly backwards. On the other hand the blocking force is sufficient to prevent pin 9 being moved by the pressure of the plastics developed in the moulding cavity.

The moulding tool is shown at the stage where material introduced in plastic form into cavity 21 has been moulded into an end 4 welded to a tube 5. End 4 comprises the junction with the frusto-conical shoulder part forming the tube and also has a threaded neck 32 and an apron 33 extending into the tube interior. Neck 32 and apron 33 co-operate to form a continous axial neck channel 34 having a mouth 35 at one end connected to the tube interior. At the other end, the tube interior is connected via lateral access passages 26 to the neck channel. The passages are distributed round the periphery of portion 25 and formed in correspondence with the spaces between slots 31, i.e. in the axial region which co-operates without clearance with part 23 of bore 22. Radially inward ribs 37 corresponding to slots 31 in portion 25 form in the neck channel 34 and extend to near the outlet opening 38 of channel 34. When end 4 connected to tube 5 is manufactured, it is released from the mould by pulling back punch 2 and by rotating the threaded part 7 so that neck 32 is unscrewed.

I claim:

1. A core for moulding the top part of a plastic container having a continuous axial neck channel surrounded by a tubular sleeve, integral with said container, said sleeve having a lateral access passage therethrough, said core comprising:

an outer part having a peripherally non-divided casing and having a bore extending into one end; and an inner part axially movable into said outer part, said inner part comprising a pin having a first portion and a second portion, said first portion having longitudinal grooves and penetrating with a sliding fit into said bore, said second portion having a smaller diameter than said first portion and said bore, a space between said second portion and said bore providing a mould cavity for forming said sleeve and communicating by way of said grooves with said mould cavity to permit flow of plastic material into said space.

2. A core according to claim 1, said bore having a guide portion and said second portion being adapted to rest in said guide portion.

3. A core according to claim 1, said bore further comprising a conical portion and a bottom, said first portion of said pin having the same or lesser conicity for engagement with said conical portion and said second portion of said pin having an end for abutting against said bottom, said pin bearing axially at said end on said bottom of said bore.

4. A core according to claim 3, wherein said second portion of said pin is cylindrical, said guide portion is cylindrical and the depth of penetration of said second portion into said guide portion is greater than the depth of penetration of said first portion into said bore.

5. A mould for forming a top part of a container having a continuous axial neck channel surrounded by a tubular neck sleeve integral with said container, said mould comprising:

a female mould member and a core together defining a first cavity for forming said top part;

said core being insertable in said female mould, said core having an outer member;

a pin removable from said outer member, said outer member and said pin defining a second mould cavity therebetween for forming said tubular sleeve, said first and second mould cavities being circumferentially continuous; and communicating means extending between said first and second mould cavities, said communicating means being circumferentially discontinuous.

6. The mould of claim 5, wherein said communicating means comprises a plurality of grooves connecting said first and second mould cavities.

7. A mould for forming a top part of a container having a continuous axial neck channel surrounded by a tubular neck sleeve integral with said container, said mould comprising:

a female mould member and a core together defining a first mould cavity for forming said top part;

said core being insertable in said female mould, said core having an outer member;

a pin removable from said outer member, said outer member and said pin defining a second mould cavity therebetween for forming said tubular sleeve, said first and second mould cavities being circumferentially continuous; and grooves provided in the surface of said pin and extending between said first mould cavity and said second mould cavity for communication therebetween.

8. The mould of claim 7, wherein said mould is provided with means for maintaining said pin in said engaged position.

9. The mould of claim 7, wherein said pin has a first portion and a second portion, said first portion having longitudinal grooves and penetrating with sliding fit into a bore in said outer member, said second portion having a smaller diameter than said first portion and said bore.

10. The mould of claim 9, wherein said bore further has a conical portion and a bottom, said first portion of said pin having the same or lesser conicity for engagement with said conical portion and said second portion of said pin having an end for abutting against said bottom, said pin bearing axially at said end on said bottom of said bore.

11. The mould of claim 7, wherein said bore has a guide portion and said second portion is adapted to rest in said guide portion.

12. The mould of claim 11, wherein said second portion of said pin is cylindrical, said guide portion is cylindrical and the depth of penetration of said second portion into said guide portion is greater than the depth of penetration of said first portion into said bore.

13. In a mould for moulding the top part of a plastic container, having a continuous axial neck channel surrounded by a tubular sleeve integral with said container, said sleeve having lateral passages for access from the interior of the container to the axial neck channel, said mould having a female mould member and male mould member and defining a first mould cavity therebetween, a core comprised by said male mould member and including:

an outer part having a peripherally non-divided casing and having a bore extending into one end; and an inner part axially movable into said outer part, said inner part comprising a pin having a first portion and a second portion, said first portion having longitudinal grooves with lands therebetween and penetrating within a sliding fit into said bore, said second portion having a smaller diameter than said first portion and said bore, said second portion and said grooves in said first portion of said inner part defining together with said bore in said outer part a second mould cavity including between said second portion and said bore an annular space for forming said tubular sleeve, and delimited by said longitudinal grooves and said bore conduits for forming ribs connecting said tubular sleeve with the top part of the container, said lands together with said bore providing said lateral passages, said second mould cavity communicating by way of said conduits with said first mould cavity to permit flow of plastic material into said second cavity from said first cavity.

14. A mould for forming a top part of a container having a continuous axial neck channel surrounded by a tubular neck sleeve, said mould comprising:

a female mould member and a core together defining a first cavity for forming said top part;

said core being insertable in said female mould, said core having an outer member;

a pin removable from said outer member, said outer member and said pin defining a second mould cavity therebetween for forming said tubular sleeve, said first and second mould cavities being circumferentially continuous; and communicating means extending between said first and second mould cavities, said communicating means being circumferentially discontinuous.

15. The mould of claim 14, wherein said communicating means comprises a plurality of grooves connecting said first and second mould cavities.

16. A mould for forming a top part of a container having a continuous axial neck channel surrounded by a tubular neck sleeve, said mould comprising:

a female mould member and a core together defining a first mould cavity for forming said top part;
said core being insertable in said female mould, said core having and outer member;
a pin removable from said outer member, said outer member and said pin defining a second mould cavity therebetween for forming said tubular sleeve, said first and second mould cavities being circumferentially continuous; and
grooves provided in the surface of said pin and extending between said first mould cavity and said second mould cavity for communication therebetween.

* * * * *